June 25, 1963
L. L. SCHOENSTEIN
3,094,890
AIR CONTROL FOR THE PIPES OF A PIPE ORGAN
Filed Aug. 24, 1959
3 Sheets-Sheet 1
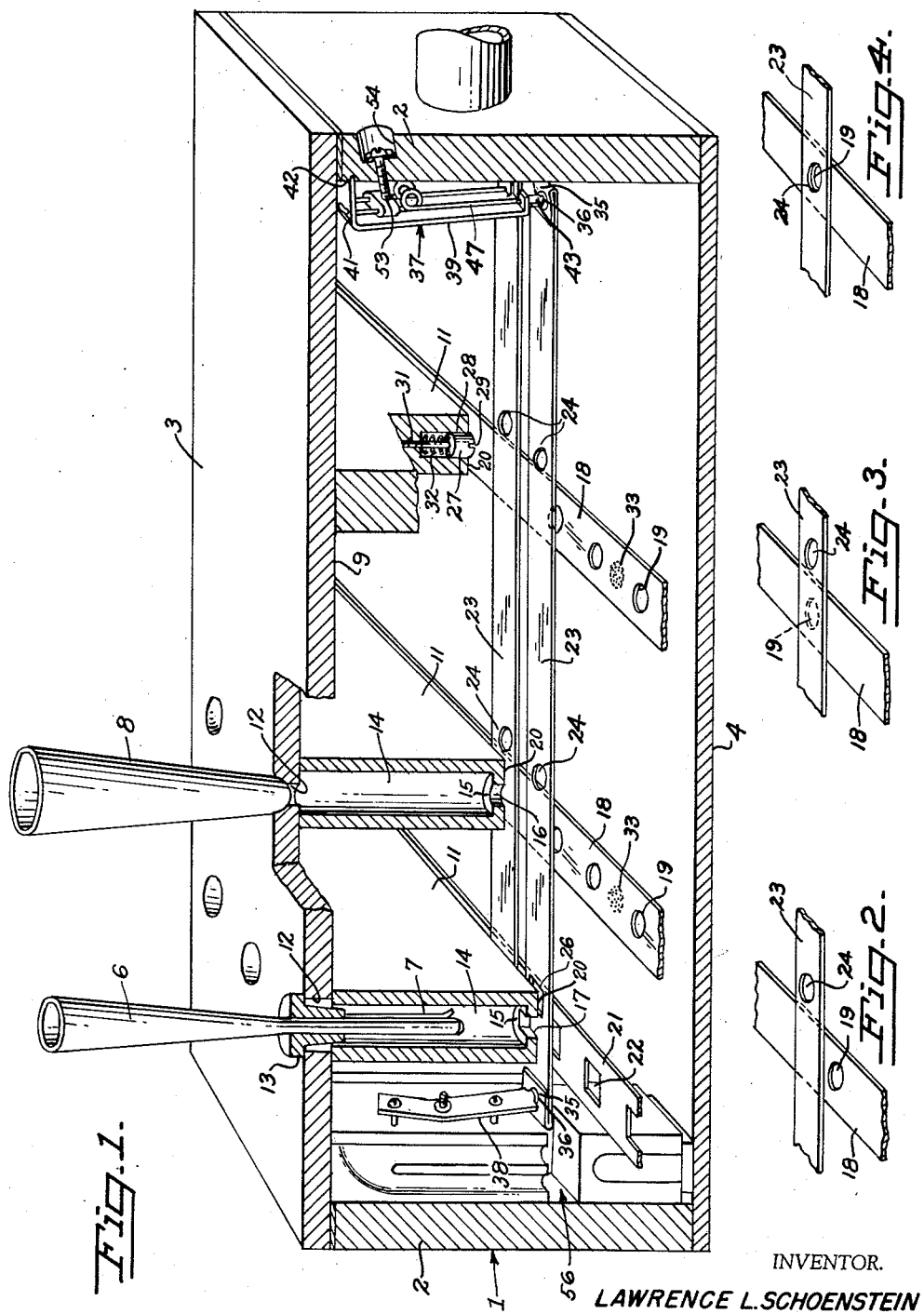
INVENTOR.
LAWRENCE L. SCHOENSTEIN
BY
George B. White
ATTORNEY

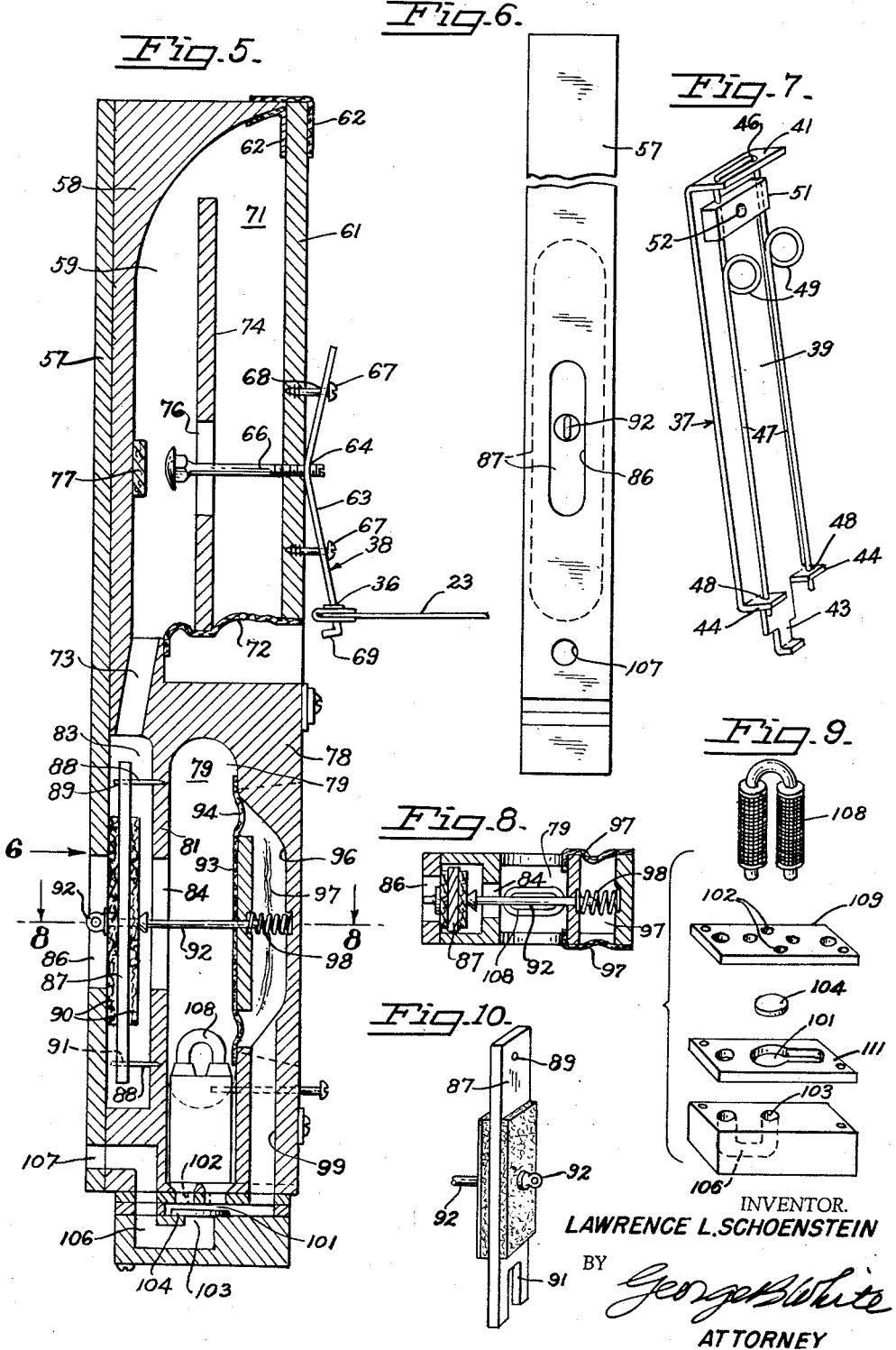

June 25, 1963 L. L. SCHOENSTEIN 3,094,890
AIR CONTROL FOR THE PIPES OF A PIPE ORGAN
Filed Aug. 24, 1959 3 Sheets-Sheet 3
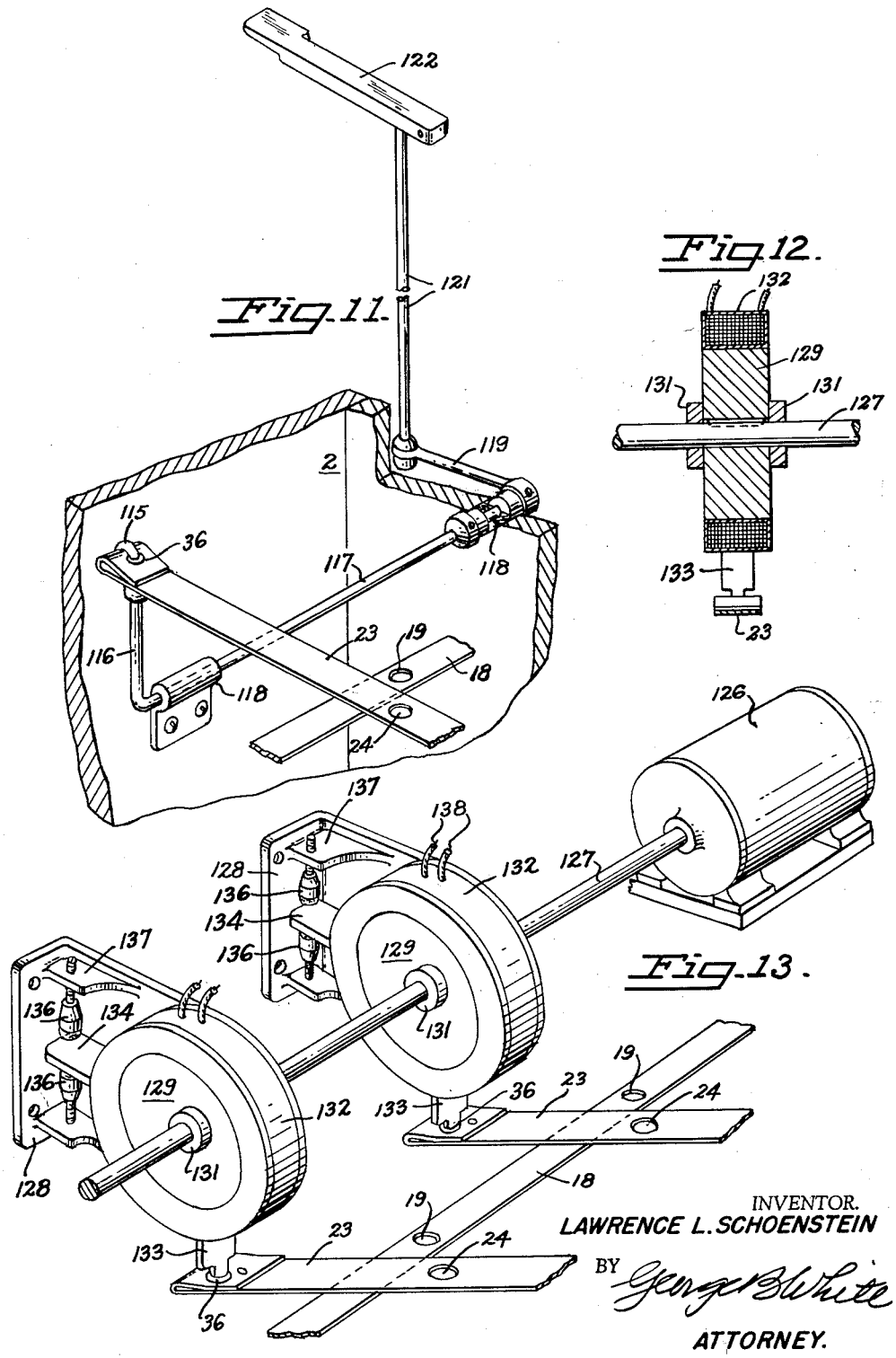
INVENTOR.
LAWRENCE L. SCHOENSTEIN
BY George B White
ATTORNEY.

United States Patent Office 3,094,890
Patented June 25, 1963

3,094,890
AIR CONTROL FOR THE PIPES OF A PIPE ORGAN
Lawrence L. Schoenstein, 130 Nueva Ave., San Francisco 24, Calif.
Filed Aug. 24, 1959, Ser. No. 835,633
34 Claims. (Cl. 84—332)

This invention relates to an improvement in the compressed air control to the pipes and stops of a pipe organ.

It is the general object of this invention to provide a control device for the compressed air which includes so called sliding strips or tapes in an intersecting system so as to cause the pipes to speak when corresponding apertures in the intersecting sliding strips are in registry with the orifices leading to the respective pipes or stops.

Another object of the invention is to improve the quality of tone and speech of the organ pipes by minimizing the air turbulence at the pipe valve by providing thin sliding strips which produce the least turbulence, eddy currents or vortexes, and by providing apertures on the sliding strips which are suitably shaped for the respective type of speech and volume of air required at the particular organ pipe.

Another object of this invention is to provide intersecting systems of sliding strips or tapes with apertures registerable with the orifices leading to the pipes or stops of the organ, and to support the said sliding tapes in such a manner as to eliminate the use of guides or fixed supports and obviate friction and sticking.

Another object of the invention is to provide sliding strips or tapes at the control device for the air flow to the pipes of a pipe organ and maintain said strips in close proximity of the pipe orifices in such a manner as to prevent the pipes from speaking partially when wind is first put into the windchest of the organ, cells being provided between the strip or tape controls and the actual intake ends of the pipes to form intake air chambers in the nature of plenum chambers to convert the jet-like intake from the intake orifice into substantially uniform pressure or flow to the pipes whenever the valves are opened.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a diagrammatic sectional view showing the arrangement of the control strips in the windchest of an organ in relation to two types of organ pipes, with parts broken away and parts shown in section.

FIG. 2 is a fragmental perspective diagrammatic view showing the strips with the respective apertures out of registry.

FIG. 3 is a perspective diagrammatic view showing the intersecting strips with the stop strip in aperture registering position but the key strip still in the initial position.

FIG. 4 is a perspective diagrammatic view showing both strips in position for registering the respective apertures with one another in the position to admit air to the orifice.

FIG. 5 is an enlarged cross-sectional view of an electropneumatic actuator for the strips.

FIG. 6 is a fragmental view of the electro-pneumatic actuator viewing from the direction of arrow 6 in FIG. 5.

FIG. 7 is an enlarged perspective view of the resiliently yieldable brackets for holding and returning strips to predetermined initial position.

FIG. 8 is a sectional view taken on the lines 8—8 of FIG. 5.

FIG. 9 is an enlarged developed view of the electromagnetic valve arrangement at the bottom of the electropneumatic actuator.

FIG. 10 is a perspective detail view of the flap intake valve for the electro-pneumatic actuator.

FIG. 11 is an enlarged somewhat diagrammatic view of a manual actuator.

FIG. 12 is an enlarged sectional view of an electro-magnetic clutch-type actuator.

FIG. 13 is an enlarged perspective view of the multiple arrangement of the electro-magnetic actuator for the control strips.

In the herein illustration the details of the well known customary structure of the chest and frame and pipes of the organ are not shown. In FIG. 1 there is a representation of a windchest 1 of the organ which has the usual sidewalls 2, a topwall 3 and a removably attached bottom 4.

The usual organ pipes are arranged in rows called "stops" and are set over the windchest 1 which latter is a chamber filled with compressed air. Each pipe is set over an orifice. In the present illustration, and for illustrative purposes, out of each row of pipes, only one is shown and two types of pipes are illustrated. The pipe 6 is a so called lingual pipe and is provided with a reed 7. In the other stop or row of pipes the one shown for illustration is a so called labial pipe 8. In the present illustration on the underface 9 of the top 3 are provided rails 11 corresponding to each row or stop of pipes. There are rows of nesting orifices 12 in the top 3 of the windchest 1 in which the labial pipes 8 are suitably nested. Each lingual pipe has a packing gland 13 on it which extends through the larger nesting orifice 12 and contains and holds the reed 7 in operative position.

Each rail 11 has a cell or chamber 14 in axial alignment with the nesting orifice 12 and the respective pipe thereon. The inner end or bottom 15 of each cell 14 is provided with an intake orifice 16. It is to be noted that in connection with the labial pipe 8 the cell 14 operates as an expansion cell and it has a circular intake orifice 16. Under the lingual pipe 6 the cell 14 primarily functions as a container for the reed 7 but in order to have more precise attack, the intake orifice 17 is rectangular in shape.

The bottom 20 of each rail 11 is flat. A stop strip or tape 18 provided with a plurality of apertures 19 extends along the bottom 20 of each rail 11. Said apertures 19 are spaced from one another symmetrically to the spacing between the intake orifices 16 along the bottom 20 of the rail 11.

Under the rail 11 on which the stop of lingual pipes 6 are mounted, the stop strip 21 is provided with rectangular apertures 22 also spaced symmetrically with the orifices 17 along the bottom 20 of the rail 11.

The stop strips 18 and 21 are held in an initial position out of registry with the respective orifices 16 and 17, and means are provided, as hereinafter described, to slide the stop strips 18 or 21 selectively into aperture registering position, namely into a position where the respective apertures 19 and 22 are in registry with the respective orifices 16 or 17.

Key strips 23 extend at right angles across the stop strips 18 and 21 and are located or positioned between the bottoms 20 of the rails 11 and the stop strips 18 and 21 respectively so that the key strips 23 are supported in position by the respective stop strips 18 and 21. It is customary in the symmetrical arrangement of the pipes in pipe organs that the orifices for the respective stops or rows are spaced in a manner that the orifices on the respective rails 11 are also symmetrical and therefore a key strip 23 can register with all the orifices 16 or 17 on all the rails 11 under which the key strip 23 extends. Of course, no air can be admitted to any orifice unless both the key strip 23 and the respective stop strips 18 or 21 are in aperture registering position simultaneously. In the arrangement, as shown in FIG. 1, the key strips 23 are provided with both circular apertures 24 and a rectangular aperture 26 depending upon the arrangement of the corresponding intake orifices 16 and 17.

It is to be noted that as the round apertures 19 and 24 of the respective stop strip 18 and key strip 23 are shifted into registering position with the adjacent orifice 16, the opening or uncovering is in the nature of an eclipse between the apertures 19 and 24 and thus compressed air is introduced gradually and smoothly which is conducive to an airflow or attack most suitable for the voicing and best tone in labial pipes. As the square apertures 22 and 26 of the respective stop strip 21 and key strip 23 are shifted to register with the rectangular orifice 17, the overlapping is not in the same nature as the circular eclipse, but it admits larger volume of air immediately which is conducive to an incisive airflow or attack most suitable for the voicing and clearest tone of lingual pipes.

While the compression of the compressed air in the windchest 1 normally would press the flexible tapes or strips 18, 21 and 23 up against the bottoms 20 of the respective rails 11, nevertheless in order to prevent any unnecessary noise or vibration, the stop strips 18 and 21 are suitably drawn and slidably held against the bottoms 20 of the respective rails 11 without undue friction. For this purpose at spaced intervals there are provided magnets 27 inserted in sockets 28 in the bottoms of the rails 11. In the present illustration each magnet 27 has a screw slot 29 therein and a screw stem 31 for securing the magnet into the bottom of the socket 28. A coil spring 32 in the socket 28 urges the magnet 27 outwardly of the socket 28 to facilitate correct adjustment. The correct adjustment of the magnet 27 is such that the outer end of the magnet is flush with the bottom of the block 11, although for weakened magnetic action the magnet might be screwed further into the socket 28.

The stop strips or tapes 18 and 21 are provided at spaced intervals between the apertures 19 and 22 with magnetic areas 33 which are attracted to the magnets 27. The magnetic areas 33 are so spaced that they are opposite to the respective magnets 27 in the initial position of the strips but are freed from the magnets when the strips are shifted into aperture registering position, thus positive support is accomplished mainly when the strips are in orifice covering position which is important mainly to eliminate so called chirping or partial cyphers of the pipes when compressed air is first introduced into the windchest. The stop strips 18 thus support the respective crossing key strips 23. These magnetic areas 33 can be obtained by imbedding in the tape magnetic particles or a magnetic plate or by coating the surface with a magnetic film. The spacing found practical at present provides magnetic areas 33 at about six or seven apertures apart.

Each of the strips or tapes 18 or 21 or 23 is held in an initial position and it is operated and shifted in the same manner and therefore the description of the support and the shifting mechanism or actuator of one strip will suffice and will apply to all the strips. As shown in FIG. 1, each strip or tape is reinforced at each end thereof by a suitable fold 35 turning upon itself and by the provision of a suitable eyelet 36. A resiliently yieldable bracket 37 mounted on a sidewall 2 of the windchest 1 engages the eyelet 36 at the adjacent end of the strip or tape and holds the same. A suitable finger 38 at the opposite side wall 2 is adapted to engage the eyelet 36 at the adjacent other end of the strip. This latter finger 38 is connected to a suitable operating mechanism or actuator for pulling the strip against the resiliently yieldable action of the bracket 37 into the aperture registering position and when this pull is released, then permitting the resilient bracket 37 to return the strip to its initial position where the respective apertures are out of registry with the respective orifices.

The structure of the bracket 37, as shown in FIGS. 1 and 7, includes a flat plate 39, an end of which is bent at right angles into a pivot flange 41 which latter is rested in a notch 42 on the side wall 2 of the windchest 1. The other end of the flat plate 39 is formed into a finger 43 bent for engagement with the adjacent eyelet 36 of the strip. At the base of the finger 43 a pair of ears 44 extend from the plate 39 generally parallel with the pivot flange 41. The pivot flange 41 has a pair of spaced holes 46 therein through which extend the legs of a generally U-shaped spring wire 47. The free ends of the legs of the spring wire 47 are inserted into holes 48 in the respective ears 44. Each leg of the spring wire 47 has also a circular spring loop 49 formed therein. Across the legs of the spring wire 47 and between the loops 49 and the pivot flange 41 is an adjusting block 51 into a threaded hole 52 of which is screwed an adjusting screw 53. This adjusting screw 53, as shown in FIG. 1, extends through the adjacent wall 2 and the head of the screw is concealed in a socket 54 on the outside face of the wall 2 so that tension of the spring can be adjusted from outside of the chest by turning the screw 53. As the engaged strip is pulled, the pull is exerted on the finger 43 of the resilient bracket 37 and it moves the bracket 37 about its pivot notch 42 away from the adjacent wall 2. But the spring block 51 is held by the screw 53, hence it places a tension upon the loops 41 which tension functions as a stored force for returning the strip to the initial position when the pull thereon is relieved. This initial position is determined by the adjustment of the adjusting screw 53.

The other or operating pulling finger 38 may be operated in any suitable manner provided that its operating means is connected to the usual keys and stop control of the organ for suitable manipulation.

The usual manipulation of valves in pipe organs is by electropneumatic mechanisms and one of the embodiments of such operating mechanism herein is such electropneumatic operating mechanism 56 outlined in FIG. 1 and shown in detail in FIGS. 5, 6, 8, 9 and 10. This operating mechanism or actuator 56 includes a base board 57 which is adapted to be suitably mounted on an adjacent sidewall 2 of the windchest 1. On the baseboard 57 is mounted a chamber housing wall 58, which extends perpendicularly and then curves at its top to form wall at the top of a chamber 59. This chamber 59 is covered on its front or inner side by a flap wall 61 which is hinged by suitable flexible strip of leather or the like hinges 62 so as to be movable toward and away from the backwall 58 of the chamber 59. On this flap wall 61 is mounted the finger structure 38 which in this illustration is a bent bar 63 with a hole 64 at its apex loosely held on the end of a pivot screw 66 threaded into the flap wall 61 so as to leave the atmospheric openings 87 and 107 exposed. At equidistance from the pivot hole 64 are provided set screws 67 whereby the position of the lower end of the bar 63 can be predetermined. This lower end of the bar 63 is formed with a hooked finger 69 engageable with the eyelet 36 of the adjacent end of a tape or strip as particularly shown in FIG. 5. The sides of the chamber 59 are covered by soft flexible covering such as leather sides 71 and the bottom is also formed by a flexible bottom such as leather bottom 72. At the bottom there is an unobstructed passage 73 leading into the chamber 59. A transverse stiffener 74 is connected at its respective edges to the sides 71 and bottom 72 so as to move with the same and with the hinged movement of the flap wall 61. A large hole 76 through the stiffener 74 accommodates the pivot screw 66. A pad 77 on the backwall 58 of the chamber 59 cushions the inner head of the pivot screw 66 upon the collapsing of the chamber and the swinging of the flap wall 61. The position of the set screw 66 predetermines the stroke of the strip pulling.

The operation of such flap wall is usual in pipe organs, namely when the passage 73 is communicated with the compressed air in the windchest, then the pressure being equalized, the flap wall 61 is held in an initial position shown in FIG. 5. Whenever the passage 73 is communicated with the atmosphere and is shut off from the compressed air in the windchest, then the compressed air pushes the flap wall 61 toward the backwall 58 of the chamber 59 and as it swings around its hinge edge 62, it pulls the bar 63 and the finger 69 and thereby shifts the respective tape or strip connected to the finger 69.

The selective communication of the passage 73 is accomplished by a construction shown in FIGS. 5, 6, 8, 9 and 10. Beneath the aforedescribed chamber 59 is provided a body 78 which has a central transverse cavity 79 open at the opposite sides into the compression chamber or windchest 1. The backwall 81 of this cavity is spaced from the baseboard 57 so as to form a valve chamber 83 below the passage 73 and communicating with the latter. The backwall 81 has an elongated valve opening 84 and the base board 57 has a corresponding elongated valve opening 86 opposite the valve opening 84. Between the valve openings 84 and 86 and in the valve chamber 83 is a disk valve 87 which can be alternately shifted to cover the valve openings 84 or 86 according to from which side the pressure is applied. This valve 87 is guided on a pin 88 extended through a guide hole 89 at its top and a similar pin 88 extended through a slot 91 at its bottom. In this manner the valve 87 remains in vertical position. The valve 87 is provided with suitable face padding 90 to render its operation noiseless. In the middle of the valve 87 is fastened a valve stem 92 which latter is secured in a floating rigid base 93. This base 93 in turn is supported on a flexible, such as leather, wall 94 suitably secured at its top and bottom edges to the respective edges of a recess 96 in the body 78 opposite from the valve 87. The sides of this recess 96 are also covered by thin flexible material 97 so as to form an enclosed chamber in the recess 96. A light coil spring 98 bearing against the bottom of the recess 96 and against the floating board 93 normally urges the board and the stem 92 so as to push the valve 87 against and close the outer atmospheric opening 86. The bottom of the recess 96 is communicated by a passage 99 to a bottom valve chamber 101. This valve chamber 101 has a compressed air intake 102 at its top and an atmospheric port 103 below it so that as a valve disc 104 moves up or down, accordingly, it opens the passage 99 to the atmosphere or to the compressed air which latter enters through the transverse cavity 79. The atmospheric port 103 is connected by a passage 106 to an atmospheric exhaust 107 in the baseboard 57.

A suitable electromagnet 108 is secured in the body above the valve chamber 101. In operation the electromagnet is normally deenergized and compressed air enters through the transverse cavity 79 and through the intake 102 into the valve chamber 101 and holds the valve disk 104 in closing position on the atmospheric port 103. The compressed air passes through the passage 99 into the recess 96 and presses the baseboard 93 so as to force the stem 92 and the disk valve 87 into closing position against the atmospheric valve opening 86. In this position there is a space opened between the valve 87 and the backwall 81 of the cavity and compressed air passes through that space up in the recess 83 and through the passage 73 into the upper chamber 71 and equalizes the pressure therein with the compressed air pressure in the windchest and thus holds the flapping wall 61 in the position shown in FIG. 5.

In order to pull the tape the key or pedal or stop or other control is connected in the usual well known electric circuit so that as a key or control is manipulated, it energizes the electromagnet 108 which draws the valve disk 104 up so as to close the compressed air intake 102 and open the atmospheric port 103. The compressed air then pressing on the baseboard 93 collapses the walls of the recess 96 and expells the air through the port 103, passage 106 and outlet exhaust 107 and thereby pulls the valve 87 against the backwall 81 to close the inner valve opening 84, thereby shut off the compressed air from the recess 83. The recess 83 and the passage 73 are in this position open to the atmosphere through the atmospheric valve opening 86. The compressed air is thus permitted to act against the flap wall 61 and swings it inwardly so as to collapse the chamber 59 and thereby to push the finger 69 with the flap wall 61 and thus shift the tape or strip into the aperture registering position. As soon as the key is released, the electromagnet 108 is deenergized, the compressed air pushes the disk valve 104 down upon the atmospheric port 103 and immediately passes through the passage 99 into the recess 97 to expand it, thereby pushing the baseboard 93 outwardly so as to press the valve 87 against the atmospheric opening 86 and thus again communicate the recess 83 and passage 73 with the cavity 79 so that compressed air from the windchest rushes into the chamber 59 and returns the flapping wall 61 to its initial position.

To facilitate assembly and operation the magnetic valve 108 is mounted on a plate 109 as shown in the developed view FIG. 8, which plate 109 is secured by suitable screws over a key plate 111, which key plate has in it an opening shaped like a key hole, the round end of which is above the atmospheric intake 103 from which extends a lateral depression forming the connecting passage between the valve chamber 101 and the vertical passage 99. In the plate 109 are provided a pair of apertures between the legs of the electro-magnet 108 which form the compressed air intake ports 102. These plates are superimposed and secured on the bottom block of the body which has in it a U-shaped passage to form the passage 106 with the top opening 103.

In the leverage operating mechanism shown in FIG. 11, a finger 116 is extended upwardly from a rocking shaft 117 supported in suitable journal brackets 118 on the adjacent walls 2 of the windchest 1. The upper end of the finger 116 is suitably hooked into the eyelet 36 of a tape or strip in the manner heretofore described so that as the shaft 117 is rocked in a contraclockwise direction viewing FIG. 11 it will shift the tape into aperture registering position. The other end of the rocking shaft 117 has a horizontal crank arm 119 thereon from which crankarm extends a vertical connecting rod 121, suitably connected to the manual organ key 122, or to a pedal, stop or other control. When the key 122 or other control is manipulated in the usual manner, it pushes the crank arm 119, thereby turns the shaft 117 in contraclockwise direction, viewing FIG. 11, and thereby moves the finger 116 toward the wall 2 and shifts the tape as heretofore described.

The electromagnetic operating mechanism illustrated in FIGS. 12 and 13 includes a mortor 126 suitably mounted on the adjacent wall 2 of the windchest 1. A shaft 127 is rotated by the motor 126 and extends parallel with the wall 2. Brackets 128 are mounted on a wall 2 in spaced positions suitably registering with the respective tapes. On each bracket 128 is mounted a magnetic rotor 129 between bracket journals 131. The rotor 129 is keyed to the shaft 127 and rotates constantly therewith. The rotor 129 is surrounded by an electromagnetic band 132.

Each band 132 has thereon a finger 133 engageable with the eyelet 36 of the adjacent tape. An ear 134 extends from each band 132 toward the adjacent bracket 128 and has limited movement between opposite adjustable abutments 136. These abutments 136 are threadedly secured in suitable lugs 137 on the brackets 128 so as to limit the rotation of the electromagnetic band 132 with the rotor 129 according to the space between the abutments 136 and thus adjust the stroke of tape shift. Terminals 138 of the electromagnetic band 132 are suitably connected in well known manner to a usual electric circuit and to the respective keys, pedals, stops or other controls of the organ so that when a key or control is manipulated, it closes the electric circuit which energizes the electro-magnetic band 132, which in turn then is attracted by the rotor 129 and rotates therewith to the limited extent permitted by the respective abutment 136, thereby pulls the tape into playing position, as heretofore described.

Irrespective of which kind of operating device or actuator is used, the operation of the organ has proper attack, clean repetition and prompt release as a result of the herein described tape control. The thin tapes herein are made of mylar polyester approximately .002 to .0075 inch thick, but they may be made of any suitable flexible material. The strips or tapes must be sufficiently flexible and thin so that the stop strip can support the key strips yet it can snuggly lie along the lower edges of the rails 11.

There are no guides necessary for the tapes or strips. The compressed air pressure in the windchest 1 aids in holding them against the bottoms of the rails 11 in suitable position and the stop tapes extending along the bottoms of the respective rails 11 support the key tapes running transversely across the respective stop tapes and transversely of the rails 11. The particular magnetic arrangement assists in holding the tapes against unnecessary vibration during the filling of the windchest without the need for any guide. The initial positions of the tape can be readily adjusted both by the adjustment of the spring tension of the pivot brackets 27 or by the adjustment of the position of the fingers 38 in the respective operating devices or actuator. In each instance, accurate positioning in preadjusted position is readily achieved and as soon as the stops or the keys or other organ controls are manipulated, the tapes move in the respective positions so as to rapidly align with the respective orifices of the passages leading to the pipe cells of the organ for emission of clear and well developed tonalities.

I claim:

1. In a pipe organ having a windchest with pipes thereon arranged in stops over series of orifices, compressed air control to said orifices, and selective control means for manipulation of said compressed air control; the improvements in said compressed air control including intersecting control strips superimposed on one another at the areas of their intersection, each area of intersection being in registry with one of said orifices, said intersecting strips being movable relatively to one another and relatively to the respective orifices and having air conducting apertures therethrough registerable with the respective adjacent orifices, means to urge said strips into respective initial positions with said apertures offset from the respective orifices, and means connecting each intersecting strip to the respective control means for selectively shifting the respective strips into position when said respective control means are manipulated so as to register the respective apertures of said strips with the respective adjacent orifices at said area of intersection for admitting compressed air to the respective pipes.

2. The improvement in compressed air control for a pipe organ as defined in claim 1, wherein one intersecting strip is between the respective orifice and the other intersecting strip.

3. The improvement in compressed air control for a pipe organ as defined in claim 1, wherein one intersecting strip is between the respective orifice and the other intersecting strip, said urging means being connected to one end of the respective strips and said connecting means being connected to the other end of the respective strips, said strips being flexible and freely slidable longitudinally.

4. The improvement in compressed air control for a pipe organ as defined in claim 1, wherein one intersecting strip is between the respective orifice and the other intersecting strip, and coacting means on said other intersecting strip and on said windchest to hold said other intersecting strip in sliding contact with the portion of said chest at said orifices.

5. The improvement in compressed air control for a pipe organ as defined in claim 1, wherein one intersecting strip is between the respective orifice and the other intersecting strip, and coacting magnetic means on said other intersecting strip and on said windchest to hold said other intersecting strip in sliding contact with the portion of said chest at said orifices.

6. In a pipe organ having a windchest with pipes thereon arranged in stops over series of orifices, compressed air control to said orifices, and selective control means for manipulation of said compressed air control; the improvements in said compressed air control comprising a stop strip slidably positioned over each stop series of orifices and having a series of stop apertures therethrough spaced symmetrically with the adjacent series of orifices so that the apertures of said stop strip are registerable with said adjacent series of orifices simultaneously, a key strip superimposed intersectingly on said stop strip at each stop orifice and having a key aperture therethrough registerable with the adjacent orifice, yieldable means normally holding each strip so that the respective apertures thereof are out of registry with the respective orifices, operating means connected to said stop strip and actuated by said control means to move said stop strip into position to register the stop apertures with the adjacent series of orifices, operating means actuated by said control means to move said key strip in position to register the key aperture with the adjacent orifice and with the stop aperture at said orifice thereby to admit compressed air to said orifice, said yieldable means returning the respective strips to said out of registry position when said operating means are released.

7. The invention defined in claim 6, each of said strips being of flexible thin material, and said key strips being positioned between the adjacent stop strip and the adjacent orifice.

8. Compressed air control means for a pipe organ with organ playing keys and stops and with series of orifices for the pipes arranged in stops in a windchest, comprising a stop strip slidably extended along a series of said orifices and having a series of apertures registerable with the series of orifices simultaneously, a key strip slidably positioned in intersecting relation to said stop strip at each orifice and having an aperture therethrough registerable with said orifice, yieldable mounting means at one end of each strip normally urging the strip into a predetermined initial position with the apertures of the strip offset from the respective orifices, a strip actuating device connected to the other end of each strip for pulling the strip into aperture registering position, and means responsive to the organ playing keys and stops to operate the respective strip actuating devices.

9. The compressed air control means for a pipe organ defined in claim 8, and a rail in said windchest along each stop series of pipes, each series of said orifices being along the bottom of a rail, each rail having therein a chamber formed between each orifice and a pipe on the windchest above said orifice to conduct compressed air from said orifice to said pipe, each stop strip being positioned along the bottom of the adjacent rail and being shiftable longitudinally along said rail bottom.

10. The compressed air control means for a pipe organ defined in claim 8, and a rail in said windchest along each stop series of pipes, each series of said orifices being along the bottom of a rail, each rail having therein a chamber formed between each orifice and a pipe on the windchest above said orifice to conduct compressed air from said orifice to said pipe, each stop strip being positioned along the bottom of the adjacent rail and being shiftable longitudinally along said rail bottom, and each key strip being slidably positioned between one of said orifices and the respective stop strip.

11. The compressed air control means for a pipe organ defined in claim 8, and a rail in said windchest along each stop series of pipes, each series of said orifices being along the bottom of a rail, each rail having therein a chamber formed between each orifice and a pipe on the windchest above said orifice to conduct compressed air from said orifice to said pipe, each stop strip being positioned along the bottom of the adjacent rail and being shiftable longitudinally along said rail bottom, and coacting magnetic means on said rail bottom and said stop strip to hold said stop strip in slidable contact with said bottom rail in said initial position so as to prevent air vibration in said pipes when the windchest is initially filled with compressed air.

12. The compressed air control for pipe organs as defined in claim 8, said yieldable mounting means including a bracket finger pivotally anchored on an adjacent wall of said chest and connected to the adjacent end of the strip, and resiliently yieldable means biased to urge said bracket finger toward said chest wall for pulling the strip into said initial position.

13. The compressed air control for pipe organs as defined in claim 8, said yieldable mounting means including a bracket finger pivotally anchored on an adjacent wall of said chest and connected to the adjacent end of the strip, a spring biased to urge said bracket finger and strip toward said chest wall, and a spring anchor adjustably secured in said chest wall and being accessible from outside of said chest to adjustably bias said spring to a predetermined position of said bracket.

14. A device to pull a perforated valve strip in the windchest of a pipe organ longitudinally into an initial offset position relatively to the respective pipes of the organ, comprising a bracket, an anchor flange on said bracket extended toward an adjacent wall of said windchest, said chest wall having a pivot notch therein, said anchor flange being anchored in said notch, a finger on the free end of said bracket, means on said strip engaged by said finger for transmitting pull to said strip, spring means on said bracket biased to urge said bracket and finger to said initial offset position, and adjusting means in said chest wall being accessible from outside said windchest to adjust said spring means.

15. The compressed air control for pipe organs as defined in claim 8, said strip actuating device including a rockable finger connected to said strip, and means to rock said finger for pulling said strip into aperture registering position against the pull of said yieldable mounting means.

16. The mprovement in compressed air control for a pipe organ as defined in claim 1, certain of said pipes being lingual and the others labial, the orifices for said lingual pipes being of generally rectangular shape and the orifices for said labial pipes being of generally circular shape, the apertures of said stop strips along the stop of lingual pipes being of rectangular shape matching said rectangular orifices, and the apertures of said key strips adjacent each rectangular orifice being rectangular shape and adjacent said circular orifices being circular.

17. The improvement in compressed air control for a pipe organ as defined in claim 1, an element in the windchest having an individual chamber leading from each orifice to the adjacent pipe, certain of said pipes being lingual, reeds of each lingual pipe projecting into the adjacent chamber, said orifice at each lingual pipe being generally of rectangular shape, the other pipes being labial pipes, said orifice at each labial pipe being generally circular, the apertures on said strips corresponding to said orfices being respectively of rectangular shape and circular shape matching the respective orifices with which such apertures respectively coact.

18. Compressed air control means for a pipe organ as defined in claim 8, said strip actuating device including a rockable finger connected to said strip so as to exert a pull longitudinally of the strip, means to rock said finger for pulling said strip into aperture registering position against the pull of said yieldable mounting means, and adjusting means coacting with said finger and said rocking means to adjust the relative stroke of pull by said finger.

19. Compressed air control means for a pipe organ as defined in claim 8, said strip actuating device including a rockable finger connected to said strip so as to exert a pull longitudinally of the strip, a pneumatic actuator for rocking said finger respectively for pulling and releasing said strip, said pneumatic actuator including a bellows chamber, a swingable actuating wall on said bellows chamber, means to mount said finger on said swingable wall, and a valve device adapted to be operated in response to the respective organ playing keys and stops for exhausting said bellows chamber to the atmosphere for pulling said finger and strip and for inflating said bellows chamber by the compressed air in the windchest for returning said finger and strip to the initial non playing position.

20. Compressed ar control means for a pipe organ as defined in claim 19, said valve device including a valve at the intake of said bellows chamber being selectively openable to the atmosphere and to the compressed air in the windchest, a secondary bellows chamber, a swingable wall on said secondary bellows chamber connected to said valve so as to open said valve to the atmosphere when said secondary bellows chamber is collapsed and to open said valve to said compressed air when said secondary bellows chamber is inflated, an electromagnetically actuated valve normally communicating said secondary bellows chamber with the compressed air in the windchest for inflating said secondary bellows chamber, and an electromagnet responsive to the respective key and stop of the organ for closing said electromagnetically actuated valve so as to shut off the compressed air supply from said secondary bellows chamber and open said last chamber to the atmosphere thereby to collapse said last chamber.

21. Compressed air control means for a pipe organ as defined in claim 8, said strip actuating device including a rockable finger connected to said strip so as to exert a pull longitudinally of the strip, an electromagnetic actuator for rocking said finger respectively for pulling and releasing said strip, said electromagnetic actuator including a series of brackets on a wall of said windchest, a shaft journalled in said brackets, a motor rotating said shaft, a magnetic rotating element on said shaft at each bracket, an electromagnetic band surrounding each rotating element, said finger being mounted on said band for rocking whenever said electromagnetic band is energized to move with said rotating element and when deenergized in response to the playing of the respective key or stop of the organ, and adjustable means to predetermine the stroke of movement of said band with said rotating element.

22. Compressed air control means for a pipe organ as defined in claim 8, said strip actuating device including a rockable finger connected to said strip so as to exert a pull longitudinally of the strip, a shaft rockably mounted on said windchest, said finger extending from said shaft for engaging the adjacent strip, and lever and link connection between said rocking shaft and the respective key or stop of the organ for rocking said shaft so as to rock said finger and respectively pull or release the adjacent strip.

23. In compressed air control means for pipe organs with a series of orifices for the pipes arranged in stops in a windchest, a stop strip longitudinally and slidably extended along a series of said orifices and having a series of apertures registerable with the series of orifices, a key strip longitudinally and slidably positioned in intersecting relation to said stop strip at each orifice and having an aperture therethrough registerable with said orifice, and means for shifting said strips for registering said apertures with the respective orifices for playing said organ, said key strip being between the orifice and the stop strip, said strips being of flexible, thin material, a series of spaced magnets held on said windchest along said series of said orifices, and means to form spaced magnetic areas on said stop strip in registry with said magnets to be attracted by said magnets for holding said stop strip in orifice covering position.

24. The invention defined in claim 23, wherein said windchest has a series of cavities each to accommodate one of said magnets, and means to adjustably secure each magnet into the adjacent cavity.

25. The invention defined in claim 23, wherein each magnetic area on said stop strip is formed by magnetic particles integrated with said strip.

26. In a compressed air control means for pipe organs having series of orifices for the pipes arranged in stops on a wall of a windchest a flat surface formed on said wall inside said windchest and along said series of orifices, a strip having a series of apertures registerable with the adjacent series of orifices simultaneously, positioned flat against said surface over said series of orifices so as to cover the respective orifices, and being pressed against said surface by the compressed air in said windchest and being longitudinally slidable along said surface, yieldable mounting means at one end of each strip normally urging the strip into a predetermined initial position with the apertures of the strip offset from the respective orifices, a strip actuating device connected to the other end of each strip for pulling the strip into aperture registering position, and means to operate said strip actuating device.

27. The compressed air control means for pipe organs defined in claim 26, wherein each of said strips is a flexible tape.

28. The compressed air control means for pipe organs defined in claim 27, and coacting magnetic elements on said strip and on said adjacent surfaces and between said orifices to hold said strip flat against said orifices in said initial position.

29. In a compressed air control means for pipe organs with orifices for the pipes on a wall of a windchest, a tape positioned over certain of said orifices and having apertures registerable with said orifices along said wall and within said windchest and being pressed against said wall by the compressed air in said windchest; yieldable mounting means in said windchest at one end of the tape normally urging the tape in a predetermined initial position with the apertures of the tape offset from the respective orifices, a tape pulling device in said windchest connected to the other end of said tape for pulling the tape into aperture registering position, and means to impart pulling force to the tape pulling device at will.

30. In a compressed air control means for a pipe organ, having organ playing controls and a windchest with orifices through a wall of the windchest to conduct compressed air to pipes arranged on said windchest, a flexible tape positioned on the inside face of said wall and along a selected set of orifices so as to be pressed against said wall by the compressed air in said windchest and having a series of apertures registerable with said orifices simultaneously, yieldable mounting means in said windchest engaging one end of said tape for normally urging the tape into a predetermined position with the apertures of the tape offset from the respective orifices, an actuating device connected to the other end of said tape for pulling the tape into aperture registering position, and means responsive to the organ playing controls to operate the actuating device.

31. In a compressed air control means for a pipe organ defined in claim 30, and another tape intersecting said first mentioned tape and being positioned along the inside of said wall and being at the area of intersection between said first mentioned tape and at least one of said orifices, said other tape having an aperture registerable with said one of said orifices, and means to shift said other tape at will for selectively registering its aperture with said one orifice.

32. Compressed air control means for admitting air to an orifice on the windchest of a pipe organ, comprising a pair of strips in said windchest intersecting each other in superimposed relation at the orifice, each strip having an aperture therein registerable with the said orifice and being longitudinally slidably held in position against said orifice by the compressed air in the windchest, means normally to urge said strips respectively in an initial position so as to offset the respective apertures from said orifice, and a strip actuating device connected to each strip for pulling the respective strips into aperture registering positions relatively to said orifice, said strip actuating devce being responsive to the operating mechanism of the pipe organ.

33. The compressed air control means as defined in claim 32, and magnetic means adjacent said orifice slidably to hold said strip in operative position relatively to said orifice.

34. In compressed air control means for a pipe organ having several series of orifices for the pipes arranged in a windchest in generally symmetrical spaced arrangement, a strip positioned in said windchest along each series of said orifices having a series of apertures registerable with the respective series of orifices simultaneously, a plurality of intersecting strips, each intersecting strip being positioned along respective aligned orifices of said several series of orifices and having a plurality of apertures therethrough registerable with the respective aligned orifices simultaneously, means to normally hold each of said strips in respective initial position with the respective apertures of the respective strips offset from the respective orifices, and a strip actuating device for each strip for pulling the strip into aperture registering position.

References Cited in the file of this patent

UNITED STATES PATENTS

| | | |
|---|---|---|
| Re. 11,669 | Skinner | June 14, 1898 |
| 159,705 | Nicholls | Feb. 9, 1875 |
| 179,902 | Egan | July 18, 1876 |
| 520,924 | Jackson | June 5, 1894 |
| 759,338 | Zebrowski | May 10, 1904 |
| 1,043,593 | Heckman | Nov. 5, 1912 |
| 1,483,855 | Stephenson | Feb. 12, 1924 |
| 1,769,369 | Deverall | July 1, 1930 |
| 1,796,386 | Moorhouse et al. | Mar. 17, 1931 |
| 2,049,076 | Norburn | July 28, 1936 |